F. BOGGS.
POTATO SORTER.
APPLICATION FILED MAY 25, 1911.
1,032,375.
Patented July 16, 1912.
2 SHEETS—SHEET 1.
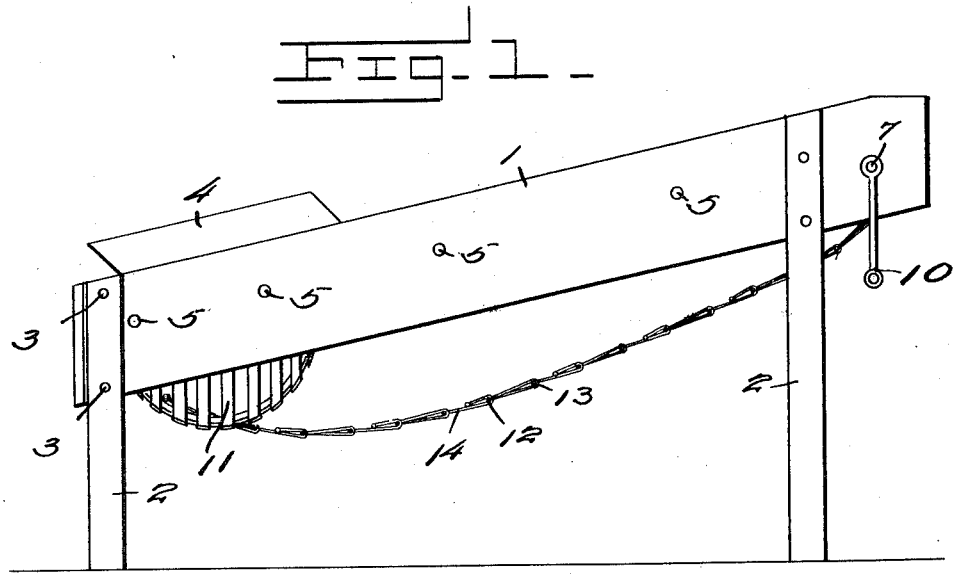
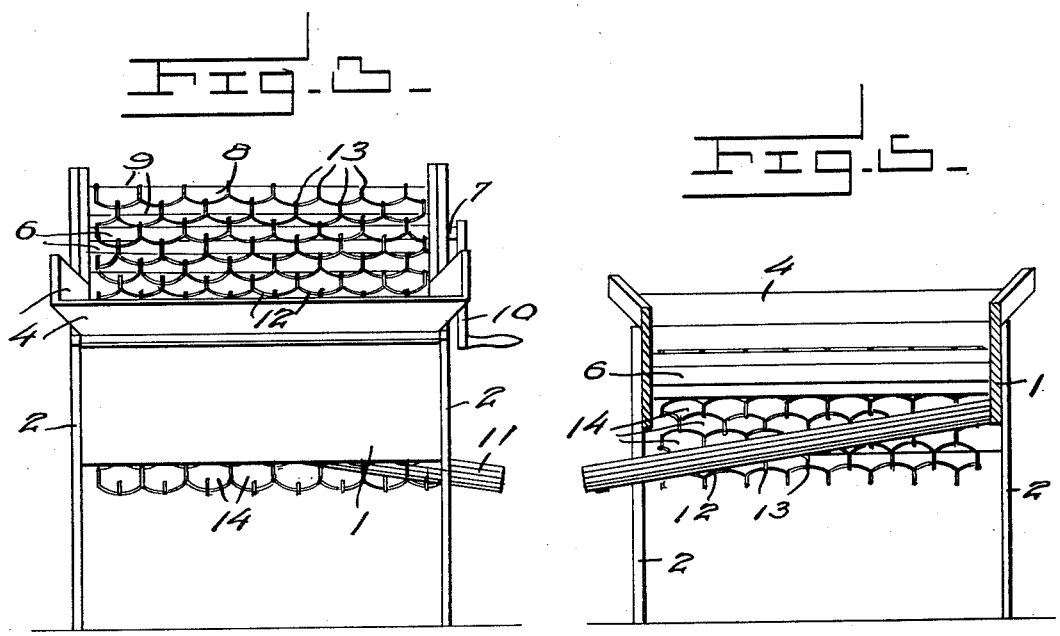
Witnesses
R. L. Armstrong.
H. K. Parsons
Inventor
F. Boggs,
By Harry Ellis Chandler
Attorney F. BOGGS.
POTATO SORTER.
APPLICATION FILED MAY 25, 1911.
1,032,375.
Patented July 16, 1912.
2 SHEETS—SHEET 2.
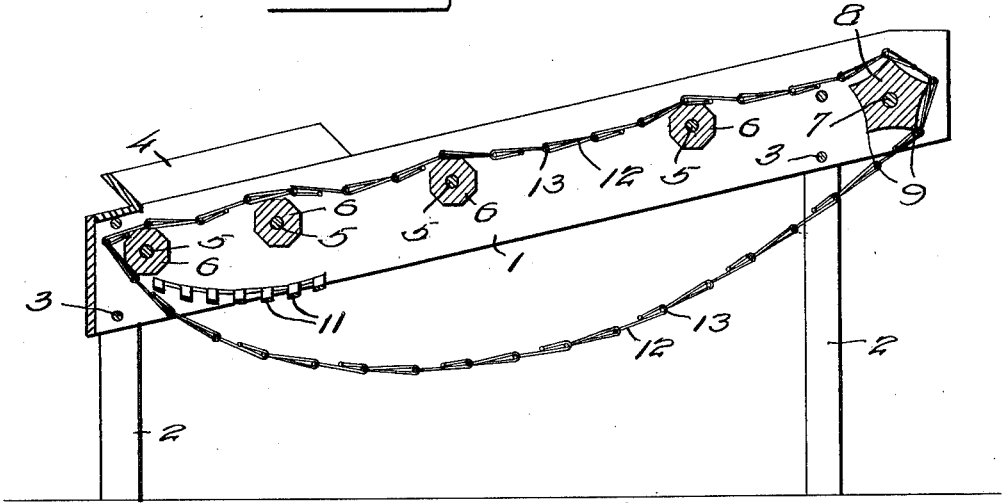
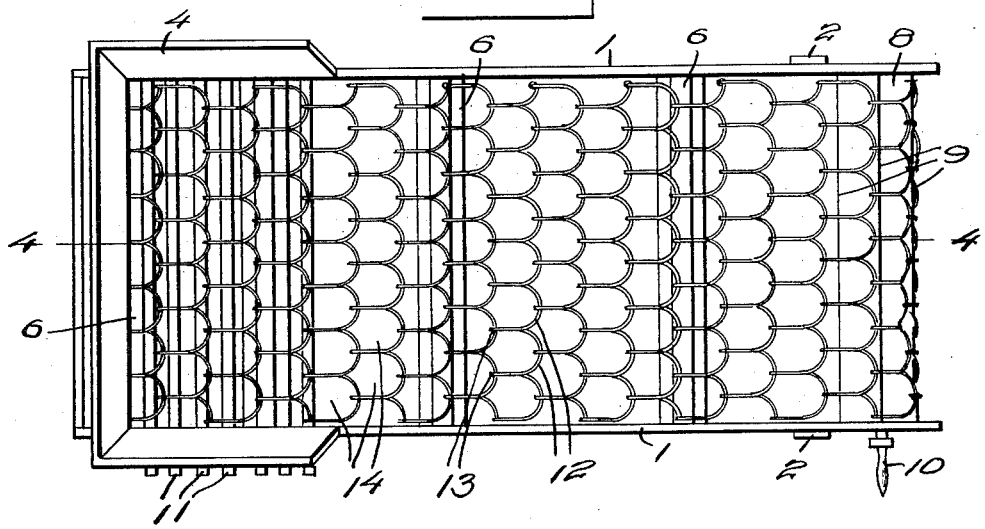
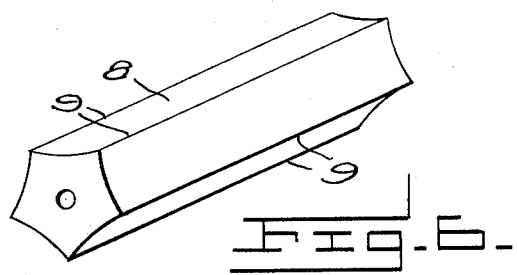
Witnesses
Inventor
F. Boggs,
By Harry Ellis Chandler
Attorney

UNITED STATES PATENT OFFICE.

FRANK BOGGS, OF PRATTSBURG, NEW YORK.

POTATO-SORTER.

1,032,375.   Specification of Letters Patent.   Patented July 16, 1912.

Application filed May 25, 1911. Serial No. 629,324.

*To all whom it may concern:*

Be it known that I, FRANK BOGGS, a citizen of the United States, residing at Prattsburg, in the county of Steuben and State of New York, have invented certain new and useful Improvements in Potato-Sorters, of which the following is a specification.

My invention relates to improvements in potato sorters, and has for its leading object the provision of an improved manually operated device which will serve to separate large and small potatoes from each other and will deliver the different sizes of potatoes into different receptacles.

A further object of my invention is the provision of an improved form of flexible belt for potato sorters which will be provided with apertures for permitting of the ready passage of the smaller potatoes through the said belt and which will be capable of ready flexing to both facilitate the passing of said belt around the various guide rollers of the sorter and to permit of sagging of the belt between said guide rollers, whereby an excess number of potatoes resting at any one point on the belt will tend to roll around on the belt and thus become better sorted than is possible with stiff belts or belts supported against ready flexing.

Other objects and advantages of my improved potato sorter will be readily apparent by reference to the following description taken in connection with the accompanying drawings, and it will be understood that I may make any modifications in the specific structure shown and described within the scope of my claim without departing from or exceeding the spirit of the invention.

Figure 1 represents a side elevation of my improved potato sorter. Fig. 2 represents a top plan view thereof. Fig. 3 represents an end view of the same. Fig. 4 represents a longitudinal sectional view on the line 4—4 of Fig. 2. Fig. 5 represents a cross sectional view of my potato sorter, and Fig. 6 represents a perspective view of one of the belt rollers.

In the drawings, the numeral 1 designates the rectangular frame of my potato sorter having the supporting legs 2 connected by the braces 3, while formed at one end of the frame portion, and flaring upward therefrom are the hopper sides 4 for guiding the potatoes onto the screening belt of the sorter. Journaled in the sides of the frame 1 are a plurality of spindles 5 upon which are rotatably mounted the angular guide rollers 6 upon which my screening belt travels. A shaft 7 is journaled in the frame 1 at the opposite end thereof from that at which the hopper portion 4 is located, while secured upon said shaft and lying between the sides of the frame is the roller 8 having five concave faces, the sections of the belt resting against the faces and the edges 9 engaging in the bends of the belt to prevent slipping of the belt. The shaft 7 has secured on one end a crank handle 10 for turning the shaft and thus the belt driving roller 8.

The belt is formed so as to have apertures to allow the smaller potatoes to pass therethrough, and the belt sags in its under portion almost to the floor upon which my sorter is supported, and secured to the under side of the frame and projecting laterally downwardly from the frame under the screening portion of the belt at the end below the hopper 4 are the slats 11 which provide a chute to receive the smaller potatoes passing through the belt and deliver said potatoes to a suitable receptacle disposed at the side of the sorter, the larger potatoes passing along on the belt and dropping off the end thereof over the roller 8.

My improved belt for sorting the potatoes is composed of a plurality of interwoven pieces of wire, said wire members each being formed into the loops 12 having the parallel arms connected by a small loop 13 the small loops 13 of one of the wire members being engaged in the central portions of the larger loops 12 of the adjacent strip of wire of the belt, there being substantially shield shaped apertures 14 provided between the various loops 12 through which the potatoes pass. It will be noted that on account of this construction, there is a complete hinged joint extending transversely of the belt at the intersection of each of the adjacent wire loops, whereby the belt will possess a maximum flexibility and will readily pass around the rollers or may sag therebetween to allow the potatoes to roll back over the apertures 14 and be more thoroughly screened or sorted.

From the foregoing description taken in connection with the accompanying drawings the construction and operation of my improved potato sorter will be readily understood, and it will be seen that as the potatoes are thrown into the hopper 4 they will drop down onto the belt, the turning of the handle 10 moving the belt over the rollers, and the smaller potatoes passing downward through the spaces or apertures 14 into the trough formed by the slats 11.

I claim:

A potato sorter, comprising a frame, a hopper mounted upon one end thereof, and angular rollers rotatably supported by the frame, and a screening belt adapted to pass over said rollers, said belt being formed from strips of wire each of said strips being formed into a series of loops, the connecting portions of the loops of one strip being engaged in the loops of the adjacent strip whereby said loops of adjacent strips are staggered with respect to each other, and the adjacent strips have pivotal movement with respect to each other, the line of pivoting of the strips extending transversely of the frame, and being adapted to engage the angles of the rollers, and a chute arranged transversely of the frame and directly under the hopper so that potatoes passing through the belt will be ejected at the side of the frame.

In testimony whereof I affix my signature, in the presence of two witnesses.

FRANK BOGGS.

Witnesses:
SAMUEL E. STRAIGHT,
A. W. POLMANTEER.